US008917863B2

United States Patent
Ahrndt et al.

(10) Patent No.: US 8,917,863 B2
(45) Date of Patent: Dec. 23, 2014

(54) METHOD AND DEVICE FOR DATA PROCESSING IN A DIGITAL SUBSCRIBER LINE ENVIRONMENT

(75) Inventors: Thomas Ahrndt, Ottobrunn (DE); Martin Kuipers, Dallgow-Dëberitz (DE)

(73) Assignee: Nokia Siemens Networks Oy, Espoo (FI)

( * ) Notice: Subject to any disclaimer, the term of this patent is extended or adjusted under 35 U.S.C. 154(b) by 51 days.

(21) Appl. No.: 13/582,772

(22) PCT Filed: Mar. 5, 2010

(86) PCT No.: PCT/EP2010/052804
§ 371 (c)(1),
(2), (4) Date: Oct. 3, 2012

(87) PCT Pub. No.: WO2011/107155
PCT Pub. Date: Sep. 9, 2011

(65) Prior Publication Data
US 2013/0208885 A1    Aug. 15, 2013

(51) Int. Cl.
*H04M 9/08* (2006.01)
*H04B 3/46* (2006.01)
*H04M 3/00* (2006.01)
*H04M 11/06* (2006.01)

(52) U.S. Cl.
CPC .............. *H04M 3/002* (2013.01); *H04B 3/464* (2013.01); *H04M 11/062* (2013.01)
USPC .................................. 379/406.06; 379/88.07

(58) Field of Classification Search
CPC ... H04M 11/062; H04M 3/306; H04M 15/00; H04M 1/6505; H04M 9/082; G10L 21/06; H04B 3/20; H04B 3/23
USPC .............................. 379/406.01–406.16, 88.07
See application file for complete search history.

(56) References Cited

U.S. PATENT DOCUMENTS

| | | | |
|---|---|---|---|
| 2003/0123560 A1* | 7/2003 | Jacobsen et al. | 375/260 |
| 2008/0205609 A1* | 8/2008 | Zhou | 379/93.08 |
| 2009/0041103 A1* | 2/2009 | Shi | 375/222 |
| 2010/0014645 A1* | 1/2010 | Feng et al. | 379/27.01 |
| 2011/0206101 A1 | 8/2011 | Matza et al. | |

FOREIGN PATENT DOCUMENTS

| | | |
|---|---|---|
| EP | 2 120 348 A1 | 11/2009 |
| WO | 2010/018562 A1 | 2/2010 |

* cited by examiner

*Primary Examiner* — Akelaw Teshale
(74) *Attorney, Agent, or Firm* — Laurence A. Greenberg; Werner H. Stemer; Ralph E. Locher

(57) ABSTRACT

A method and a device for data processing in a digital subscriber line environment, wherein a flat noise margin is determined based on an actual noise determined and based on a maximum noise expected. A device is initialized using the flat noise margin. Also, a communication system is described that includes such a device.

13 Claims, 6 Drawing Sheets

METHOD AND DEVICE FOR DATA PROCESSING IN A DIGITAL SUBSCRIBER LINE ENVIRONMENT

BACKGROUND OF THE INVENTION

Field of the Invention

The invention relates to a method and to a device for data processing in a digital subscriber line environment. Also, a corresponding communication system is suggested.

DSL or xDSL, is a family of technologies that provide digital data transmission over the wires of a local telephone network.

High speed Internet access is gaining importance and is often realized via xDSL services using existing copper lines. Also, other applications emerge that require broadband transmission services, e.g., triple play offers comprising subscriber access to Internet, TV and voice data transmission. A bandwidth consuming application is the transmission of TV data via xDSL, wherein one HDTV channel requires a data rate amounting to 12 Mbit/s.

Therefore, requirements for high speed Internet access are increasing. Operators are optimizing services that are offered to their customers. This becomes a difficult task as an increasing amount of users as well as high data rates leads to higher crosstalk between subscriber lines in a cable binder. In most cases, crosstalk noise limits the performance. However, the actual problem is that crosstalk noise varies over time: There may be low crosstalk noise when a significant amount of customers have switched off their equipment and there may be a considerable amount of crosstalk noise during business hours when the majority of customers use their devices.

The fluctuation of crosstalk is getting more dynamic in case low power modes are used (see L2 mode in ADSL2 G.992.3 and ADSL2plus G.992.5). In this case, the applied transmit power varies with the actual data throughput.

It is in particular problematic if a modem has been initialized during a low crosstalk noise period and the crosstalk noise increases during operation of the modem, e.g., by additional modems (customer premises equipments, CPEs) being activated. As a consequence, the modem that has been initialized during a time of low crosstalk experiences transmission errors and connection outages during periods of high crosstalk. Hence, the modem will have to conduct a restart and synchronization, which leads to a significant service interruption (e.g., up to 75 seconds), which is inacceptable for the user especially when watching television via the broadband access.

FIG. 1 shows a schematic diagram comprising a power of a noise 101, a margin 102 and a power of user data 103 over time. An impulse noise during a time period 104 affects the user data thereby leading to CRC errors, which may be visible to a user's IPTV application. Additional noise from the DSL during a time period 105 results in a retraining of the modem adjusting its user data/margin differently starting at a time 106. Unfortunately, the retaining leads to an outage of the IPTV service, which will continue at said time 106 with a reduced data rate.

FIG. 2 shows a schematic diagram visualizing a flat noise margin 203. A power (e.g., in a logarithmic scale) over a frequency is used to illustrate a noise floor 201 of a receiver and a crosstalk noise 202 on top of this noise floor 201. The flat noise margin 203 is applied on top of both, the noise floor 201 and the crosstalk noise 202. An area beyond the noise margin 203 corresponds to a received signal power 204, i.e. is proportional to an attainable data rate. In case the crosstalk noise 202 increases beyond the noise margin, a retraining of the modem will become necessary and the noise margin will be adjusted at the cost of a reduced attainable data rate.

Hence, FIG. 2 shows an operational case of signals received at an xDSL modem in case a connection between a DSLAM and a CPE has been established. xDSL with DMT modulation can be used according to, e.g., ADSL G.992.1, ADSL2 G992.3, ADSL2plus G992.5, VDSL2 G.993.2. Even if the transmit power is constant over a certain frequency range, the reception power 204 declines at higher frequencies due to an attenuation of the channel. The amount of data that can be transported at a certain subcarrier frequency is roughly proportional to a signal-to-noise ratio (SNR). In case only thermal noise and implementation effects contribute to the noise, the achievable data rate may be substantially proportional to the area between the receiver noise floor 201 and the reception power 204 at the receiver. Crosstalk noise 202 from other lines and services limit the achievable data throughput. A moderate increase of the crosstalk noise 202 can be compensated as the signal-to-noise ratio is not fully exploited for data transmission. Instead, the noise margin 203 is provided for safety reasons. The SNR margin may represent an acceptable amount of noise received (in dB) such that the system still meets a target bit error rate (BER) amounting to $10^{-7}$.

A large target noise margin can be utilized by the modem during initialization. The high noise margin protects the system against an increasing noise level, but allows only a reduced suboptimal data rate. Such high noise margin stabilizes the system in case the noise increases. If however the increased noise due to additional operating DSL services is dependent on the frequency, the maximum noise level will be different for different frequencies.

FIG. 3 shows a schematic diagram visualizing a huge noise margin 303. A power (e.g., in a logarithmic scale) over a frequency is used to illustrate a noise floor 301 of a receiver and a crosstalk noise 302 on top of this noise floor 301. The flat noise margin 303 is applied on top of both, the noise floor 201 and the crosstalk noise 202 according to FIG. 2 and shows how the high crosstalk noise 302 can be compensated by a large flat margin 303. An area beyond the noise margin 303 corresponds to a received signal power 304, i.e. is proportional to an attainable data rate.

According to FIG. 3, the data rate corresponding to the received signal power 304 is significantly reduced in case the modem is initialized using this high noise margin 303 in a situation where the external noise from other lines is already on a high level. This high noise level leads to a reduced data rate and the large noise margin further reduces the data rate based on the fact that the target noise margin is applied on top of the measured external noise independent of its absolute level. Such kind of noise margin is however not required in case the DSL line is initialized during a situation in which a further increase of noise level is not expected.

A so-called Virtual Noise was introduced by xDSL recommendations (ITU G.993.2, G.992.3, G.992.5): An absolute Virtual Noise level is set and the maximum of external and Virtual Noise level is used by the modem during initialization instead of the measured external noise. An operator usually sets the Virtual Noise to a level of expected noise when all modems are active. Therefore, the actual noise situation does not matter when the modem is being initialized. The modem during initialization considers the maximum expected noise level, which is set by the Virtual Noise. Hence, an additional target noise margin can be set to a rather small amount since the maximum noise level is already taken into account.

It is an advantage of Virtual Noise that a set of breakpoints can be used to set frequency-dependent noise levels. This is an improvement over the flat noise margin and allows for higher data rates. This beneficial effect is also referred to as shaping gain.

However, not all xDSL variants and/or CPEs support Virtual Noise. For example, ADSL (G.992.1) does not provide any Virtual Noise, ADSL2 (G.992.3) and ADSL2plus (G.992.5) were augmented recently with Amendment 5, but corresponding CPEs may largely be implemented not considering this latest recommendation. Disadvantageously, the beneficial effects of Virtual Noise could be utilized by an operator in case a majority of or all CPEs support this feature. This is not the case at least for ADSL2/2plus CPEs and/or ADSL systems, which have been and still will be deployed.

BRIEF SUMMARY OF THE INVENTION

The problem to be solved is to overcome the disadvantages described above and in particular to provide a virtual noise functionality for a system that does not support Virtual Noise as set forth in xDSL recommendations (ITU G.993.2, G.992.3, G.992.5).

This problem is solved according to the features of the independent claims. Further embodiments result from the depending claims.

In order to overcome this problem, a method for data processing in a digital subscriber line environment is provided,
  wherein a flat noise margin is determined based on an actual noise determined and based on a maximum noise expected;
  wherein a device is initialized using said flat noise margin.

It is noted that the device, e.g., a modem arranged with a customer premises equipment (CPE) or with a DSLAM/CO, is initialized using a flat noise margin which is set based on the actual noise calculated or measured as well as a maximum noise expected. This allows the flat noise margin to provide a large enough safety margin, which could be adjusted by means of bit-swapping after initialization of the device (e.g., during Showtime of the xDSL modem).

It is noted that the size of the flat noise margin can be adjusted by such bit-swapping by substantially distributing bit-loading among the carriers, wherein the noise margin still lies on top of the noise providing a (substantially) flat margin, but with reduced width compared to the size of the margin during initialization. Hence, when the noise increases, the flat noise margin can be adjusted by reducing its size, but being substantially uniformly distributed on top of the actual noise (e.g., floor noise and crosstalk noise).

In an embodiment, the size of the flat noise margin is adjusted via bit-swapping after the initialization of the device.

Hence, this approach allows shaping the size of the noise margin dependent on the noise level by means of bit-swapping. The noise may be measured or calculated.

In another embodiment, the flat noise margin is determined by a management system
  based on the actual noise determined by the device, which is conveyed to the management system; and
  based on the maximum noise expected determined by a management system; and
wherein the flat noise margin is conveyed to the device.

Advantageously, the maximum noise expected and the actual noise conveyed are combined to determine an overall flat margin, which is then conveyed back to the device. In particular, frequency-dependent maximum noise information is combiped to determine the size of the flat noise margin, i.e. an actual noise peak may reduce the size of the flat noise margin, wherein the noise peak may be compensated by means of bit-swapping.

In a further embodiment, the maximum noise expected is determined based on a FSAN model.

The FSAN model allows determining a far-end crosstalk (FEXT) as described in [S. Galli and K. J. Kerpez, "Methods of summing crosstalk from mixed sources—part I: theoretical analysis," IEEE Transactions on Communications, vol. 50, no. 3, pp. 453-461, 2002], e.g., $$FEXT(f,n,l) = S(f) \cdot H^2(f) \cdot X_F \cdot f^2 \cdot l \cdot n^{9.6}$$

wherein
  FEXT is a far-end crosstalk;
  f is a frequency;
  n is a number of disturbing systems;
  l denotes a length of the cable;
  XF is a scalar constant;
  S(f) is a power spectral density (PSD) of interfering systems;
  H(f) is a transfer function of the cable.

This equation considers a maximum value of an overall crosstalk power with a confidence of 99% or, equivalently, choosing an interference power that is likely to be exceeded in 1% or less of all cases. Hence, the PSD models of FEXT for n interfering signals are determined.

Different systems or sources of crosstalk could be considered as follows: At a given receiver, three sources of FEXT are determined. In this case there are $n_1$ systems of a spectrum $S_1$(f) at a range $l_1$, further $n_2$ systems of a spectrum $S_2$(f) at a range $l_2$ and another $n_3$ systems of a spectrum $S_3$(f) at a range $l_3$. The expected crosstalk is determined as stated before, taking the base model for each source, raising it to the power of 1/0.6, adding these expressions, and raising the sum to the power of 0.6:

$$FEXT(f) = \left( \begin{array}{l} (S_1(f) \cdot H_1^2(f) \cdot X_F \cdot f^2 \cdot l_1 \cdot n_1^{0.6})^{\frac{1}{0.6}} ++ \\ (S_2(f) \cdot H_2^2(f) \cdot X_F \cdot f^2 \cdot l_2 \cdot n_2^{0.6})^{\frac{1}{0.6}} ++ \\ (S_3(f) \cdot H_3^2(f) \cdot X_F \cdot f^2 \cdot l_3 \cdot n_3^{0.6})^{\frac{1}{0.6}} \end{array} \right)^{0.6}$$

In this case, $H_1$(f) is the transfer function of the cable of length $l_1$ etc.

The spectra S(f) of the systems include potential transmit power reductions like downstream power back-off (DPBO) or upstream power back-off (UPBO).

In a next embodiment, the maximum noise expected is determined based on a Virtual Noise information.

The Virtual Noise is defined in xDSL recommendations (ITU G.993.2, G.992.3, G.992.5) and allows for a frequency-dependent shaping gain. However, the approach provided herein allows utilizing virtual noise information at devices that do not support or are not compatible with such Virtual Noise feature.

It is also an embodiment that the size of the flat noise margin is determined by distributing frequency-dependent portions of the noise determined by the management system across the frequency range.

Hence, the overall amount of noise (measured and expected) is integrated and then (substantially equally) distributed across the frequency range utilized (for the flat noise margin).

Pursuant to another embodiment, the flat noise margin is set such that an integral of the noise over the frequency of the flat noise margin corresponds to an integral of the noise over the frequency of a frequency-dependent noise margin on a logarithmic scale.

The noise can be associated with a power of a noise spectrum.

In particular in case crosstalk noise is low at the time of initialization, a frequency-dependent noise margin may be required, but may as such not be supported by any xDSL recommendation. Therefore, the flat noise margin is used, wherein its size can be calculated in a way that the integral over the frequency is the same as for the frequency-dependent noise margin. Hence, in case bit-swapping is utilized after initialization, the actual noise margin can be shaped, which results in a flat noise margin of different size compared to the flat noise margin configured during initialization. This bears the advantage that the size of the flat noise margin flexibly adjusts to an overall noise situation, wherein bit-swapping at least partially compensates an actual noise by utilizing carriers that experience less noise effects.

According to an embodiment, the flat noise margin is determined by $$TARSNRvn = \frac{1}{NSC} \cdot \sum_{i=0}^{NSC-1} TARSNRps[i],$$

wherein
NSC indicates a number of subcarriers;
TARSNRps indicates a target SNR per subcarrier.

According to another embodiment, the target SNR per subcarrier is determined by $$TARSNRMps[i] = VN[i] + +(H\log[i] - QLN[i]) + +TARSNRM,$$

wherein
VN[i] is a virtual noise with a transmitter-referred shape;
TARSNRM indicates a target SNR margin;
H log [i] describes channel characteristics;
QLN[i] indicates a quiet line noise;
[i] indicates a subcarrier index.

In yet another embodiment, $$(QLN[i] - H \log [i]) = TX\text{power\_}dBm[i] - SNR[i],$$

wherein
TXpower_dBm[i] is an actual frequency-dependent transmit power spectral density;
SNR[i] denotes a frequency-dependent signal-to-noise ratio.

According to a next embodiment, the device is a customer premises equipment or a central device.

The device may be any device deployed at a customer's location, e.g., the CPE, or a centrally deployed device such as a DSLAM or a CO.

The problem stated above is also solved by a device comprising a processing unit that is arranged such that the steps of the method stated herein are executable thereon.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

The device may be associated with a CPE or a DSLAM/CO.

Furthermore, the problem stated above is solved by a communication system comprising at least one device as described herein.

Figure 1:
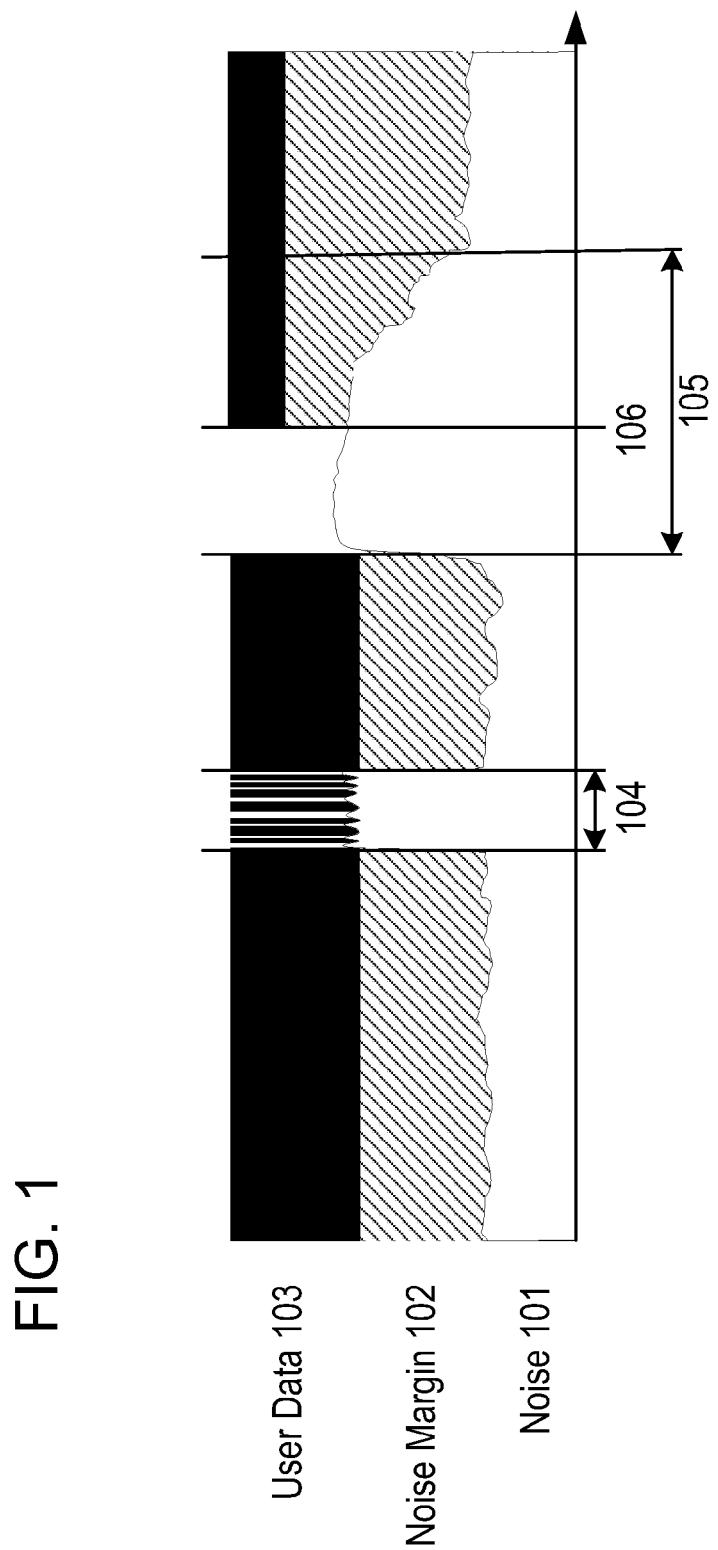
FIG. 1 shows a schematic diagram comprising a power of a noise, a margin and a power of user data over time.
Figure 2:
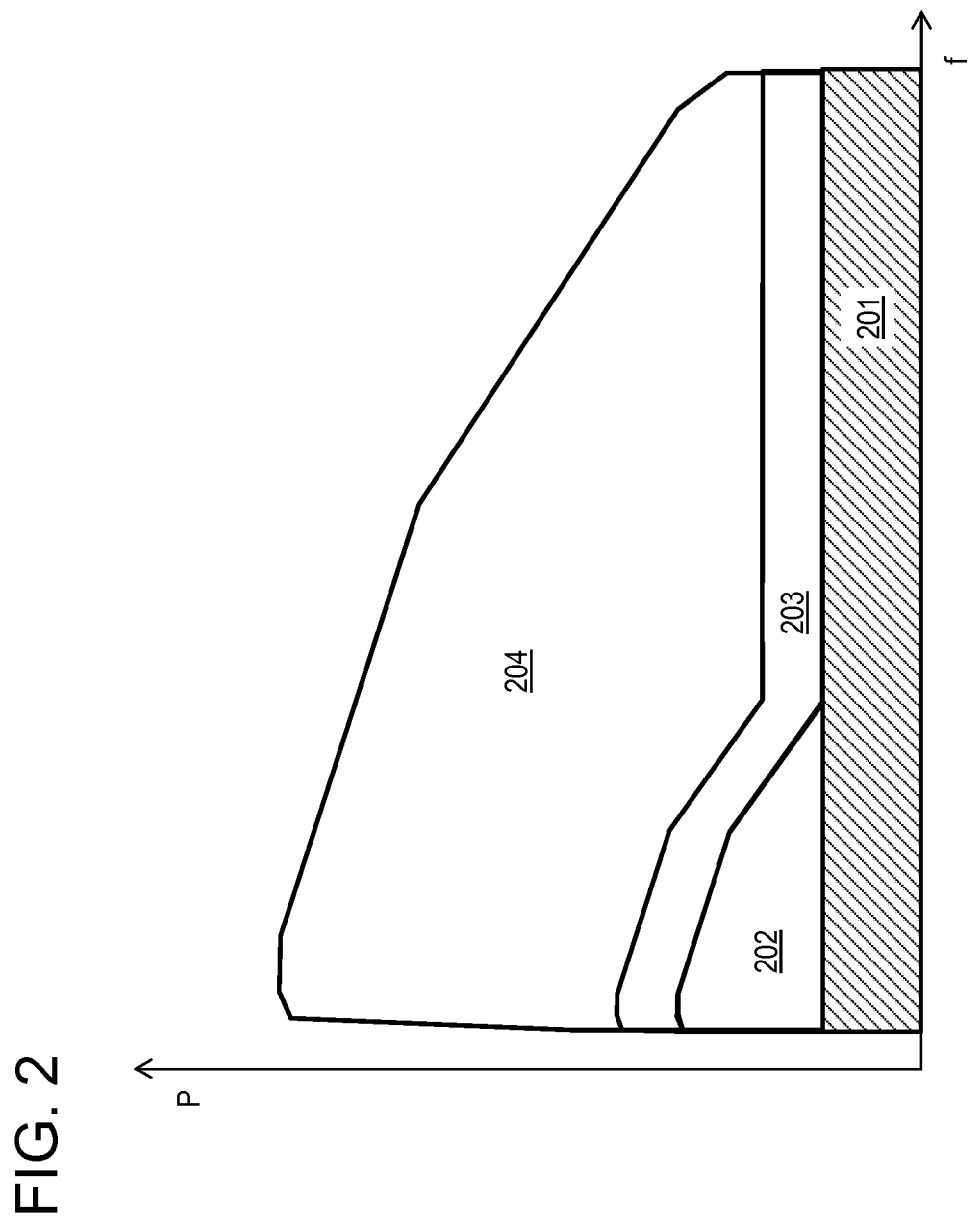
FIG. 2 shows a schematic diagram visualizing a flat noise margin.
Figure 3:
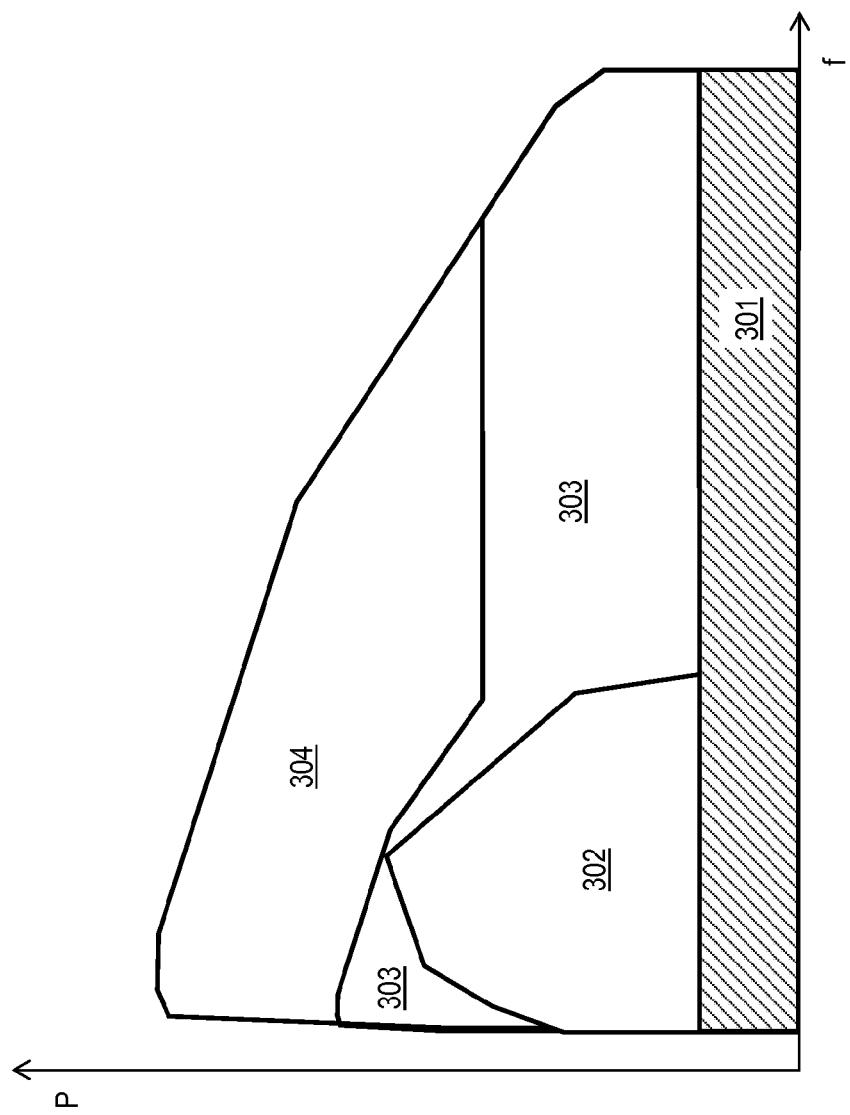
FIG. 3 shows a schematic diagram visualizing a huge noise margin.

The approach provided herein in particular suggests a virtual noise functionality in case the system does not support Virtual Noise according to xDSL recommendations (ITU G.993.2, G.992.3, G.992.5).

This approach in particular utilizes the fact that DMT-based xDSL systems support bit-swapping (e.g., according to ITU G.992.3 §10.2.1).

Hence, bit-swapping can be used to equalize the noise margin over all tones (or a set of tones) during showtime. During initialization of the DSL the system measures the signal-to-noise ratio (SNR) on each used subcarrier (also referred to as tone). The transported number of bits on each subcarrier is chosen according (in particular roughly proportional) to its SNR. This ensures that the bit error probability is substantially the same on all subcarriers. If at a later stage, some subcarriers become degraded due to an increased noise level, bit-swapping is applied to prevent transmission errors on these subcarriers.

Bit-swapping reconfigures the bit-loading on a part of or on all subcarriers. The total amount of loaded bits, and therefore the data rate, may remain (substantially) constant. As a consequence, bit-swapping reduces the number of bits on degraded sub-carriers. These bits are conveyed via other subcarriers that still provide a higher SNR margin compared to the degraded subcarrier(s). Hence, the total number of bits to be conveyed may be maintained (or kept constant).

The bit-swapping mechanisms may be used to adapt fluctuating noise as long as the noise margin does suffice and as long as the noise level does not change too quickly, which usually applies for typical applications of virtual noise based on additional DSL systems (being switched on or off).

Thus, the same effect can be achieved as with a Virtual Noise, wherein a flat noise margin can be used and is adapted during initialization to an expected maximum noise level while considering the actual noise level.

Hence, the noise level may be measured at the time of initialization at the CPE, a flat margin is determined, which suits the expected noise level taking into consideration that bit-swapping is applicable. In such case, the size of the flat margin can be adjusted to compensate different levels of noise, e.g., crosstalk noise.

BRIEF DESCRIPTION OF THE SEVERAL VIEWS OF THE DRAWING

Figure 4:
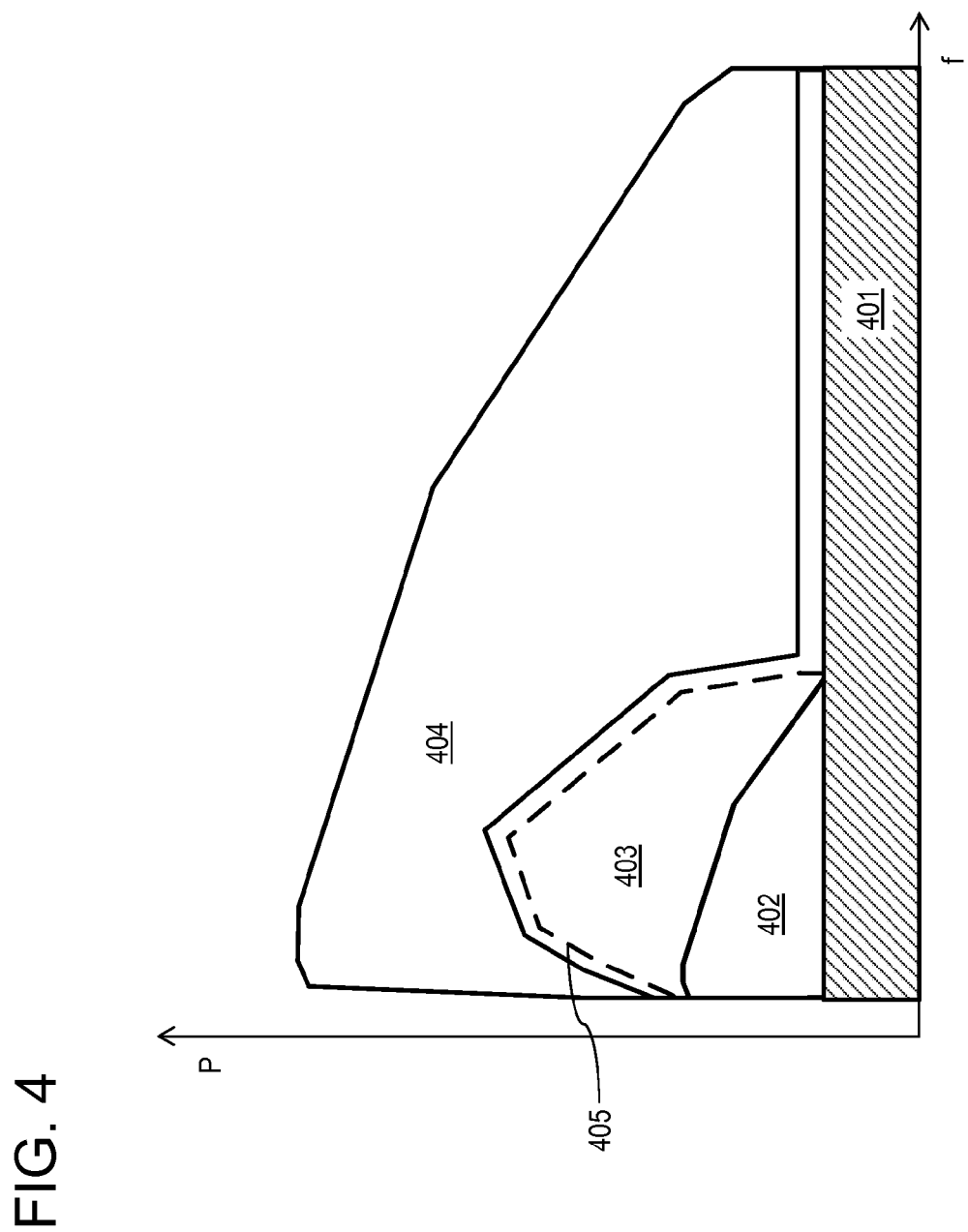
FIG. 4 shows a schematic diagram visualizing a frequency-dependent shaping of a previously flat noise margin to allow for an efficient received signal power and thus a high attainable data rate considering an actual (and expected) noise level (e.g., due to crosstalk or other interference)
Figure 5:
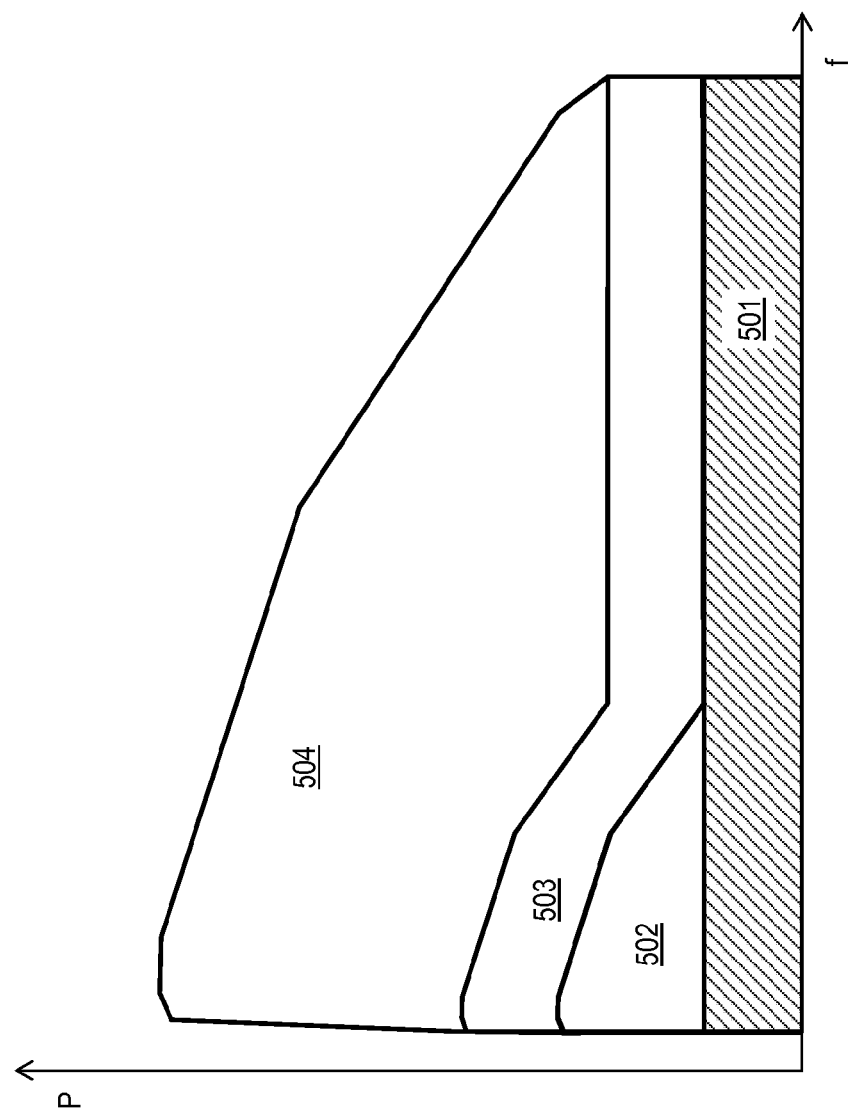
FIG. 5 shows a schematic diagram visualizing a flat noise margin with a similar (or equal) area as the shaped noise margin of FIG. 4; this flat noise margin can be calculated based on expected noise, but it is used for initializing a device that only allows being initialized using such flat noise margin.

FIG. 4 and FIG. 5 illustrate the concept of adapting a flat noise margin.

DESCRIPTION OF THE INVENTION

A power (e.g., in a logarithmic scale) over a frequency is used to illustrate a noise floor 401, 501 of a receiver and a crosstalk noise 402, 502 on top of this noise floor 401, 501. A noise margin 403, 503 is applied on top of both, the noise floor 401, 501 and the crosstalk noise 402, 502. An area beyond the noise margin 403, 503 corresponds to a received signal power 404, 504, i.e. is proportional to an attainable data rate.

In case the crosstalk noise 402, 502 is low at the time of initialization, a frequency-dependent noise margin 403 is required, which may as such not be supported by any xDSL recommendation. Thus, a flat noise margin 503 is used. The size of the flat margin 503 can be calculated in a way that the integral over the frequency is the same as for the frequency-dependent noise margin 403.

In case crosstalk noise 402, 502 will increase at a later stage (after initialization of the modem), bit-swapping can be used to shuffle bits from the affected (distorted) sub-carriers to other frequencies (subcarriers). Eventually, when the noise level has reached a shape 405, the size of the noise margin 403 may be adjusted accordingly as shown in FIG. 4.

Thus, the system has adapted to the actual noise situation (indicated by a virtual noise level 405), wherein a small but sufficient noise margin may remain.

The flat noise margin 503 is determined based on an expected noise level as well as an actual (noise) situation.

An actual noise level QLN[i] (quiet line noise) at the time of initialization of the CPE is determined, wherein [i] is a subcarrier index and corresponds to a frequency f[i]. The QLN[i] value(s) can be determined by configuring a loop diagnostic mode for the system prior to initializing the respective line. Test parameters QLN PSD (power spectral density) per subcarrier (QLNps) provide the required data.

In ADSL (G.992.1), a loop diagnostic mode is not supported. Here, the QLN[i] values can be determined as follows:

$$QLN[i] = TXpower\_dBm[i] + H \log [i] - SNR[i] \quad (1)$$

wherein

TXpower_dBm[i] is an actual frequency-dependent transmit power spectral density;
[i] is a subcarrier index;
H log [i] describes a channel characteristic;
SNR[i] denotes a frequency-dependent signal-to-noise ratio.

The values may be provided in logarithmic scale, e.g., a relative number can be given in dB and absolute powers may be provided in dBm.

A nominal transmit power spectral density, a potential power cut-back value and gains can be used for each subcarrier. All such values can be known either a-priori or from the initialization procedure.

The frequency-dependent signal-to-noise-ratio SNR[i] can be estimated from bit allocations $b_i$ on the individual subcarriers. This SNR[i] can be approximated by the following equation:

$$SNR[i] = (b_i * dSNR) + SNRGAP + SNRM \quad (2)$$

wherein
SNRGAP is an implementation-specific value, e.g., 6.5 dB;
dSNR is an implementation-specific value, e.g., 3.2 dB;
SNRM denotes an actual SNR margin that can be retrieved from the system.

ADSL (G.992.1) does not provide this test parameter H log [i]. However, only the difference between QLN[i] and H log [i] can be used. Equation (1) can be noted as:

$$(QLN[i] - H \log [i]) = TXpower\_dBm[i] - SNR[i]. \quad (3)$$

Hence, the solution to estimate QLN[i] does not only allow using ADSL (G.992.1), but also renders using the loop diagnostic mode (e.g. ADSL2 G.992.3 or ADSL2plus G.992.5) obsolete. G.992.3 and G.992.5 each provide direct access to all test parameters as indicated in equation (1). Therefore, it is not necessary to enter the loop diagnostic mode in case the modem has left Showtime only for a short period of time, during which it can be assumed that the value of QLN[i] has not significantly changed.

Next, the noise margin can be determined. Hence, a virtual noise with a transmitter-referred shape following VN[i] shall be provided. A frequency-dependent noise margin can be denoted as:

$$TARSNRMps[i] = VN[i] + +(H\log[i] - QLN[i]) + +TARSNRM, \quad (4)$$

wherein
VN[i] is a virtual noise with a transmitter-referred shape;
TARSNRM indicates a target SNR margin.

It is noted that the virtual noise VN[i] may refer to a virtual noise of a sender, e.g., DSLAM, that is attenuated according to the channel indicated by H log [i]. Hence, the source of the noise is the sender, e.g., DSLAM, the receiver utilizes the virtual noise VN[i] (see also ITU G.933.2, §11.4.1.1.6.1.2 "SNRM_Mode=2", 02/2006).

An equivalent target flat noise margin can be determined:

$$TARSNRvn = \frac{1}{NSC} \sum_{i=0}^{NSC-1} TARSNRps[i]$$

wherein
NSC is the number of used subcarriers;
TARSNRvn describes target flat noise margin;
TARSNRMps is the target SNR margin per subcarrier.

The calculated flat noise margin TARSNRvn is then set as a target margin during initialization of the DSL modem.

Figure 6:
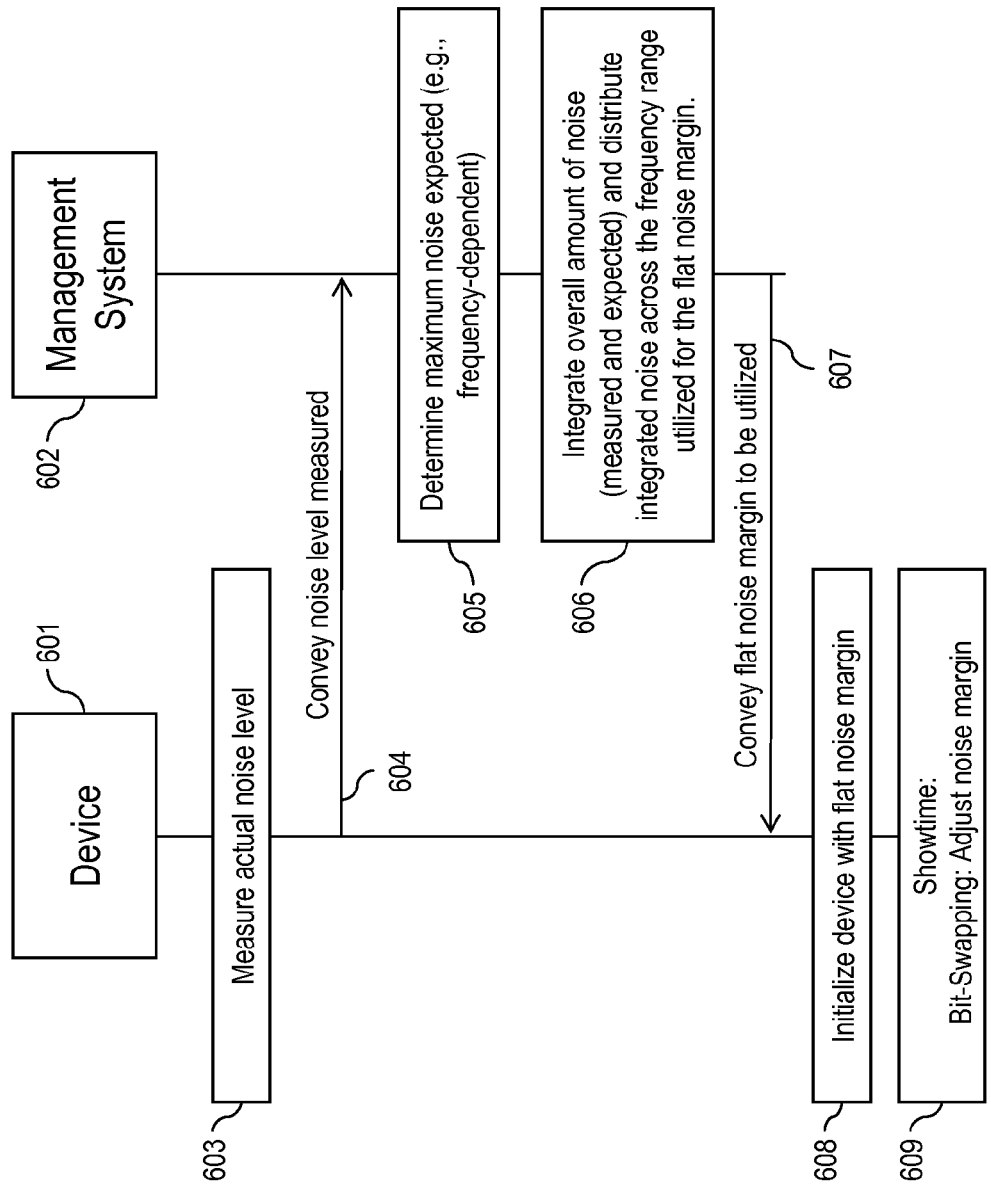
FIG. 6 shows a schematic flow chart that visualizes steps to be conducted to provide an efficient flat noise margin used for initialization purposes of a device that can be adapted during showtime in a frequency-dependent manner.

FIG. 6 shows a schematic flow chart that visualizes steps to be conducted to provide an efficient flat noise margin used for initialization purposes of a device that can be adapted during Showtime in a frequency-dependent manner.

A device 601, e.g., a CPE, measures (during its initialization) in a step 603 an actual noise level. This noise level is conveyed via a message 604 to a management system 602. The management system, in a step 605 determines a maximum noise level expected; this can be a pre-defined (frequency-dependent) noise level or it can be a measured or calculated (e.g., frequency-dependent) noise level (previous measurements of different CPEs could be utilized for that purpose as well).

In a subsequent step 606, the management system 602 integrates an overall amount of noise regarding the noise level expected as well as the noise level conveyed from the device 601 and (substantially equally) distributes the integrated noise across the frequency range that is to be utilized for the flat noise margin. Hence, a value to which the flat noise is to be set can be conveyed to the device 601 by a message 607.

The device 601 initializes its flat noise margin accordingly (step 608). After initialization, i.e. during Showtime, bit-swapping can be utilized for adjusting the noise margin.

FURTHER ADVANTAGES

The solution suggested provides the same functionality as does Virtual Noise according to xDSL recommendations (ITU G.993.2, G.992.3, G.992.5) for systems or devices that do not support such standardized Virtual Noise. Hence, ADSL and current ADSL2/ADSL2plus lines can be stabilized without a serious degradation of the data rate.

Advantageously, the present solution does not require noise to be inserted to the line in order to facilitate the adjustments. Thus, SNR is not degraded by this approach.

It is another advantage that this solution is compliant with existing recommendations and standards and does not require any hardware modification implemented, e.g., on the CPEs.

Thus, this approach can also be implemented in the management system of a DSLAM.

LIST OF ABBREVIATIONS

ADSL Asymmetric Digital Subscriber Line
CO Central Office
CPE Customer Premises Equipment
CRC Cyclic Redundancy Check
DELT Dual Ended Line Test
DMT Discrete Multi Tone
DSL Digital Subscriber Line
DSLAM Digital Subscriber Line Access Multiplexer
FEXT Far End Crosstalk
HDTV High Definition Television
IPTV Internet Protocol Television
PSD Power Spectral Density
QLN Quiet Line Noise
VDSL Very High Speed Digital Subscriber Line
xDSL any of the various types of Digital Subscriber Lines (DSL)

The invention claimed is:

1. A data processing method in a digital subscriber line environment, the method comprising:
   determining a flat noise margin TARSNRvn based on an actual noise determined and based on a maximum noise expected and by $$TARSNRvn = \frac{1}{NSC} \sum_{i=0}^{NSC-1} TARSNRps[i]$$

wherein
   NSC is a number of subcarriers, and
   TARSNRMps is a target signal-to-noise ratio (SNR) margin per subcarrier; and
   initializing a device using the flat noise margin.
2. The method according to claim 1, which comprises adjusting a size of the flat noise margin via bit-swapping after initializing the device.
3. The method according to claim 1, which comprises:
   determining the flat noise margin by a management system,
      based on an actual noise determined by the device, which is conveyed to the management system; and
      based on a maximum noise expected as determined by a management system;
   conveying the flat noise margin to the device.
4. The method according to claim 3, which comprises determining the maximum noise expected based on an FSAN model.
5. The method according to claim 3, which comprises determining the maximum noise expected based on a Virtual Noise information.
6. The method according to claim 3, which comprises determining a size of the flat noise margin by distributing frequency-dependent portions of the noise determined by the management system across the frequency range.
7. The method according to claim 3, which comprises setting the flat noise margin such that an integral of the noise over a frequency of the flat noise margin corresponds to an integral of the noise over the frequency of a frequency-dependent noise margin.
8. The method according to claim 1, which comprises determining the target SNR margin per subcarrier by $TARSNRMps[i]=VN[i]+(H \log [i]-QLN[i])+TARSNRM$, wherein
   VN[i] is a virtual noise with a transmitter-referred shape;
   TARSNRM indicates a target SNR margin;
   H log [i] describes channel characteristics;
   QLN[i] indicates a quiet line noise; and
   [i] indicates a subcarrier index.
9. The method according to claim 8, which comprises:

$(QLN[i]-H \log [i])=TX\text{power\_}dBm[i]-SNR[i]$, wherein
   TXpower_dBm[i] is an actual frequency-dependent transmit power spectral density; and
   SNR[i] is a frequency-dependent signal-to-noise ratio.
10. The method according to claim 1, wherein the device is a customer premises equipment or a central device.
11. A communications device, comprising a processing unit configured for executing the method according to claim 1.
12. The device according to claim 11, wherein the device is associated with a customer premises equipment or a digital subscriber line access multiplexer.
13. A communication system, comprising the device according to claim 11.

* * * * *